United States Patent [19]

Small

[11] 4,211,035

[45] Jul. 8, 1980

[54] HYDROPONIC GARDENING APPARATUS

[76] Inventor: William Small, 7256 South Coles, Chicago, Ill. 60649

[21] Appl. No.: 928,752

[22] Filed: Jul. 27, 1978

[51] Int. Cl.[2] .......... A01G 9/00

[52] U.S. Cl. .......... 47/62; 222/420; 239/488

[58] Field of Search .......... 47/14, 15, 16, 48.5, 47/59, 60, 61, 62, 63, 64, 65, 79, 12; 239/488; 222/420; 210/150, 161, 219, 220

[56] References Cited

U.S. PATENT DOCUMENTS

| | | | |
|---|---|---|---|
| 2,062,755 | 12/1936 | Lyons et al. | 47/62 |
| 2,854,792 | 10/1956 | Juda | 47/59 X |
| 3,660,933 | 5/1962 | Wong | 47/62 |
| 3,768,201 | 10/1973 | Yoo | 47/61 X |
| 4,059,922 | 11/1977 | Digiacinto | 47/64 X |
| 4,077,158 | 3/1978 | England | 47/59 |

FOREIGN PATENT DOCUMENTS

| | | | |
|---|---|---|---|
| 673499 | 3/1939 | Fed. Rep. of Germany | 222/420 |
| 828843 | 12/1951 | Fed. Rep. of Germany | 47/64 |
| 1266589 | 6/1961 | France | 47/61 |

*Primary Examiner*—E. H. Eickholt
*Attorney, Agent, or Firm*—Bernard L. Kleinke

[57] ABSTRACT

Hydroponic gardening apparatus mounted within its own shelter includes a lower reservoir containing a liquid nutrient, and a pump for flowing liquid nutrient from the lower reservoir to an upper reservoir. At least one feed conduit inclined downwardly away from the upper reservoir and connected in fluid communication with the interior of the upper reservoir guides under the force of gravity liquid nutrient from the upper reservoir to a container having growing media disposed in the interior thereof adapted to support and to nourish plants therein. The container is inclined downwardly toward the lower reservoir, and a return conduit is connected in fluid communication with the container for guiding liquid nutrient therefrom back to the lower container for recycling purposes. The hydroponic gardening apparatus is mounted within the interior of a shelter, and the container and conduits are mounted on support posts for the transparent roof of the shelter.

10 Claims, 5 Drawing Figures

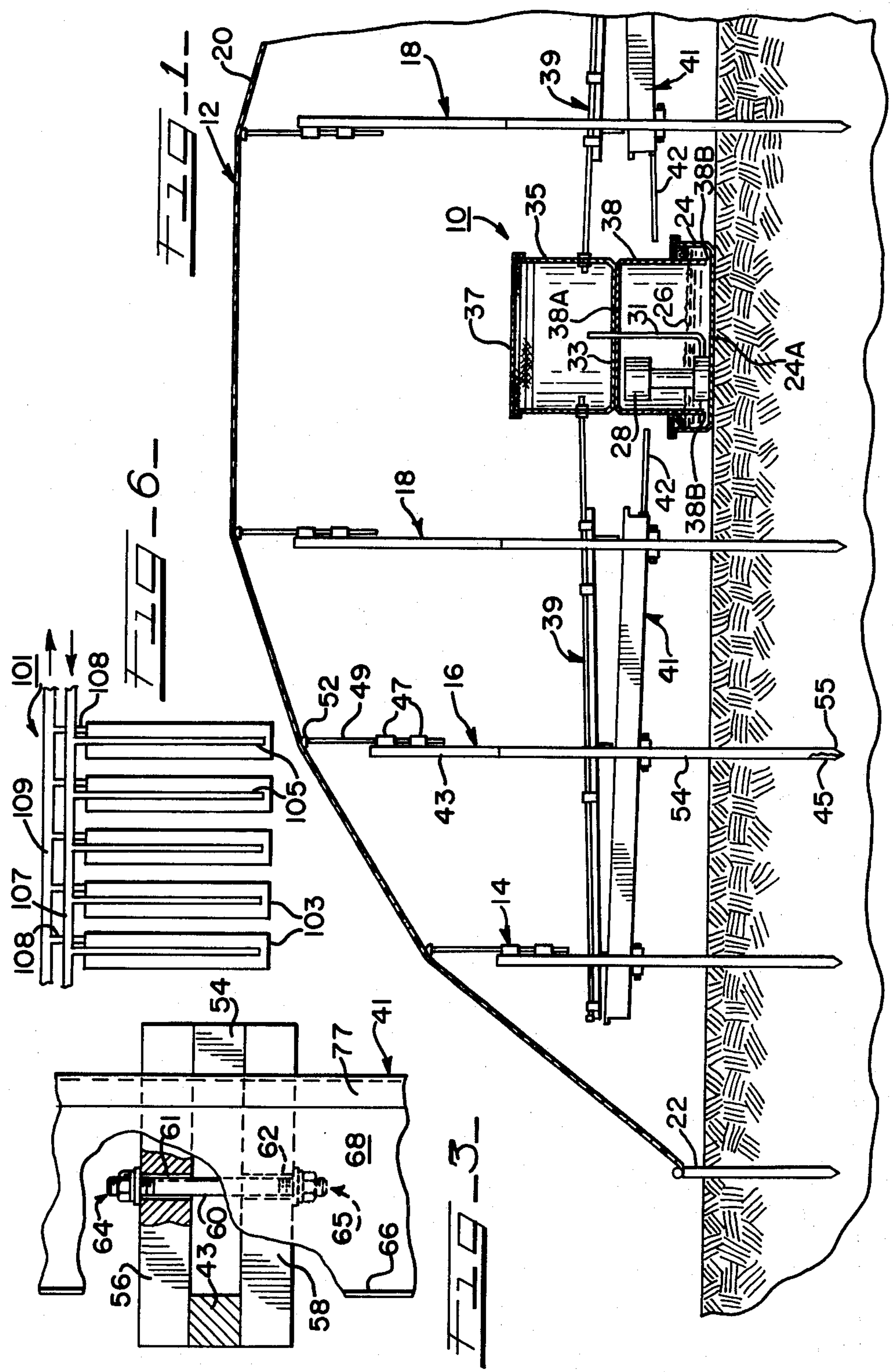

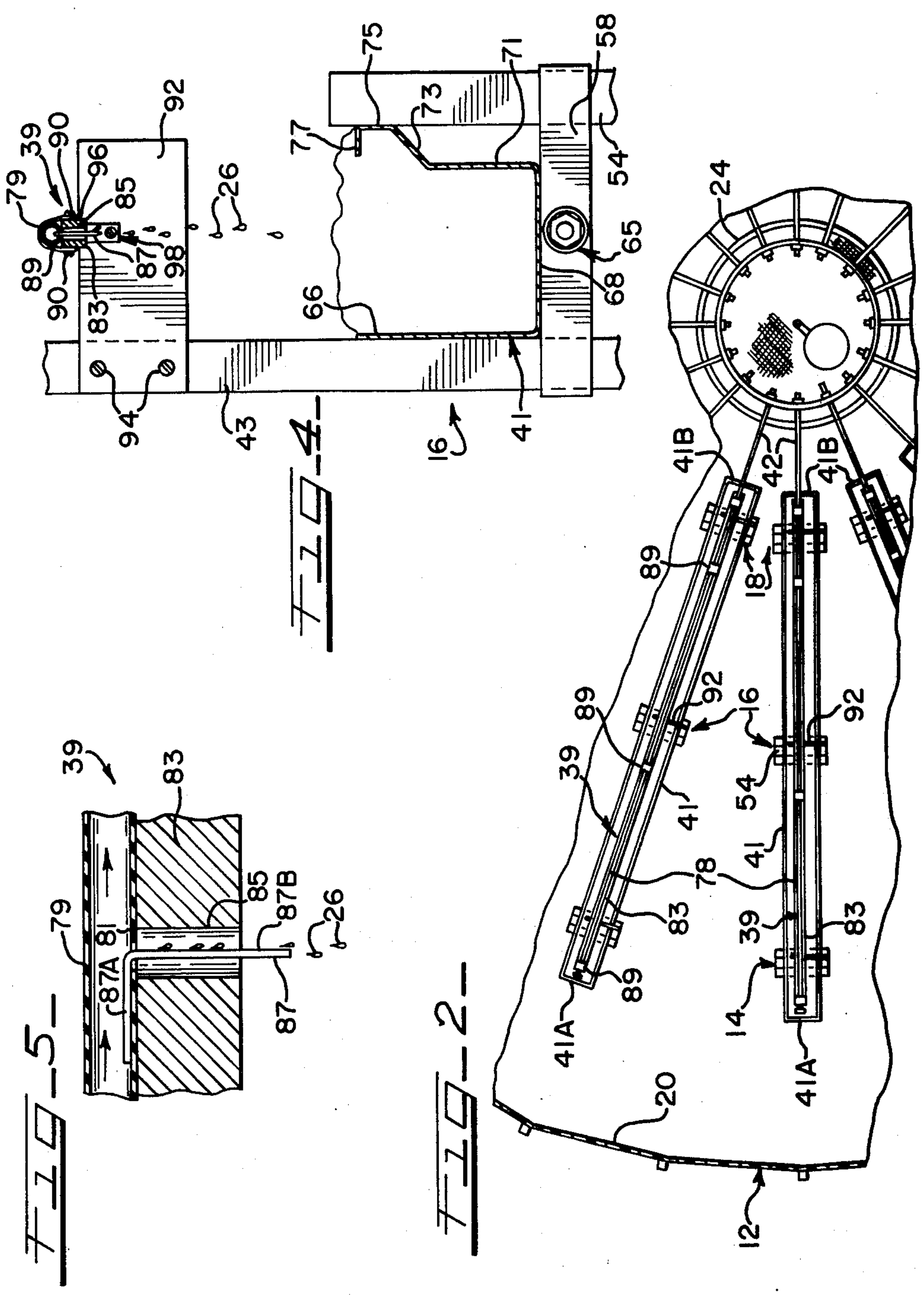

HYDROPONIC GARDENING APPARATUS

BRIEF SUMMARY OF THE INVENTION

The present invention relates in general to hydroponic gardening apparatus, and it more particularly relates to hydroponic gardening apparatus mounted within the interior of a shelter for use in relatively large scale garden production.

Commercial production of food products, such as vegetables, oftentimes required large capital expenditures for buildings and equipment to commence operations. Therefore, it would be highly desirable to have a relatively less expensive capital investment in buildings and equipment for the production of vegetables and the like. For this purpose, a relatively inexpensive green house shelter construction is disclosed in my copending patent application, Ser. No. 743,874, filed Nov. 22, 1976, now U.S. Pat. No. 4,112,956. Such a shelter construction is adapted to be used as a relatively inexpensive but functional green house. However, it would also be highly desirable to have a hydroponic gardening system adapted to be mounted within such a shelter construction in a compact manner, since such a gardening system is highly efficient for the production of garden plants. In this manner, a relatively inexpensive but highly efficient gardening apparatus could be manufactured and used commercially. If desired to be used in a commercial operation, as the production of food products increases, additional shelters and hydroponic gardening equipment could be purchased to expand the business, thereby avoiding the necessity of a large initial financial investment. Such hydroponic gardening system should be relatively inexpensive to manufacture and should be conveniently and compactly positioned within the shelter so as to utilize to a great extent the interior space of the shelter for growing purposes and yet to provide necessary space for the attendant to walk about the interior of the shelter to tend the garden.

Therefore, the principal object of the present invention is to provide new and improved hydroponic gardening apparatus, which is mounted within a shelter construction, and which is relatively inexpensive to manufacture.

Briefly, the above and further objects of the present invention are realized by providing hydroponic gardening apparatus which includes a lower reservoir containing liquid nutrient, and a pump for flowing liquid nutrient from the lower reservoir to an upper reservoir to which is connected in fluid communication at least one feed conduit connected in fluid communication with the interior of the upper reservoir and inclined downwardly away therefrom for guiding under the force of gravity liquid nutrient from the upper reservoir to at least one container having growing media disposed therein to support and to nourish plants therein. At least one return conduit connected in fluid communication with the container, which is inclined downwardly toward the reservoir, guides liquid nutrients from the container back to the reservoir for recirculating purposes. The container and conduits are mounted on support posts for the roof of the shelter, in which is positioned the hydroponic gardening apparatus.

BRIEF DESCRIPTION OF DRAWINGS

These and other objects and advantages of the present invention will become more apparent to those skilled in the art upon review of the following detailed description taken in connection with the accompanying drawings, wherein:

FIG. 1 is a fragmentary cross-sectional elevational view of a shelter construction confining the hydroponic gardening apparatus, which is constructed in accordance with the present invention;

FIG. 2 is a fragmentary cross-sectional plan view of the shelter and hydroponic gardening apparatus of the present invention;

FIG. 3 is a detail enlarged fragmentary cross-sectional plan view of one of the growing media containers showing how it is supported within the shelter;

FIG. 4 is an enlarged cross-sectional elevational view of a portion of the hydroponic gardening apparatus which is supported by the posts for the shelter of FIG. 1;

FIG. 5 is a greatly enlarged fragmentary cross-sectional elevational view of a portion of one of the feed conduits of the hydroponic gardening apparatus of FIG. 1; and FIG. 6 is a diagramatic view of another hydroponic gardening apparatus, which is also constructed in accordance with the present invention.

DETAILED DESCRIPTION

Referring now to the drawings, and more particularly to FIGS. 1 and 2 thereof, there is shown a hydroponic gardening apparatus 10, combined with a greenhouse shelter 12, which are constructed in accordance with the present invention. The greenhouse shelter 12 is generally dome shaped and includes a series of short, intermediate and long post assemblies 14, 16 and 18 arranged in concentric circles for supporting a roof 20 composed of transparent or translucent sheet plastic material. A series of ground stakes 22 secure the periphery of the roof 20 to the ground. A suitable door (not shown) is included to enable one to enter the interior of the greenhouse shelter 12. A similar shelter construction is disclosed in my co-pending patent application, Ser. No. 743,874, filed Nov. 22, 1976, now U.S. Pat. No. 4,112,956.

The hydroponic gardening apparatus 10 generally comprises a lower reservoir container 24 partially filled with a liquid nutrient 26, and a vertical centrifugal pump 28 mounted within the container 24. A discharge conduit 31 for the pump 28 extends through and is sealed within an opening in the bottom wall 33 of an upper reservoir container 35 to discharge liquid nutrient 26 into the interior of container 35 against a splash cover 37. An inverted container 38 is similar to the upper container 35 which rests thereon and has an upper wall 38A through which extends the conduit 31. A series of spaced-apart holes or opening 38B near the opened mouth bottom rim of the container 38 resting on the bottom wall 24A of the lower traylike container 24 connect in fluid communication the interior of the containers 24 and 38, the pump being disposed within the interior of the inverted container 38.

A series of radial feed conduits 39 connected in fluid communication to the interior of the container 35 near the bottom thereof extend outwardly and downwardly inclined away therefrom to guide liquid nutrient under the force of gravity radially outwardly away from the container 35 and to drip into individual elongated radially extending opened-top containers or trays 41, which are supported by the posts 14, 16 and 18 in a downwardly inclined manner toward the lower container 24, which supports plants (not shown) growing hydroponically therein. A series of return conduits 42 are connected in fluid communication at their ends to the inner end walls of the containers, which are mounted in a position on the posts 14, 16 and 18 inclined toward the lower container 24 to enable the liquid nutrient passing therethrough to exit therefrom and flow into the container 24 for recirculation purposes.

Considering now the post assemblies in greater detail, the post assemblies 16 will now be considered, it being understood that the other post assemblies are similar to them and thus there being no need for further description of them. The post assembly 16 includes a long post 43 terminating at its lower end in a pointed end portion 45 embedded in the ground. As shown in FIG. 1 of the drawings, at the upper end portion of the long post 43 a pair of clamps 47 are fixed to the post 43 and receive a rod 49 having an enlarged rounded upper end tip portion 52 for engaging and supporting the inner surface of the transparent roof 20. The clamps 47 releasably secure the rod 49 in a vertical position to the post 43 so as to enable the rod 49 to serve as an extension of the rod 43. The clamps 47 can be loosened so as to enable the rod 49 to be slid axially to an adjusted position and then tightened so that the overall length of the assembly 16 can be adjusted for ease of installation. In this regard, during assembly, the post 43, as well as all the other posts, are driven into the ground, and then the rod 49, as well as all the other rods, are positionally adjusted to support the flexible roof 20 in the desired shape as shown in the drawings.

In order to help support the radial opened-top tray 41, a short post 54 terminating at its lower end in a pointed end portion 55 embedded in the ground extends from the ground in a vertical disposition in a parallel spaced-apart manner opposite the longer post 43 to support the container 41 therebetween. As shown in FIG. 3 of the drawings, each one of the posts 43 and 54 is square in cross section throughout its length and has a pair of cross blocks 56 and 58 extending thereacross and clamped together by means of a threaded rod 60 which extends through aligned holes 61 and 62 in the respective blocks 56 and 58. Washers and nuts generally indicated at 64 and 65 secure the opposite ends of the threaded rods 60 to the respective blocks 56 and 58 to clamp them in a parallel spaced-apart manner on opposite sides of the respective posts 43 and 54 in a fixedly secure manner. In this regard, the elongated traylike container 41 rests on top of the blocks 56 and 58 securely between the parallel spaced-apart posts 43 and 54.

Considering now the traylike media containing containers in greater detail with particular reference to FIGS. 1, 2 and 4 of the drawings, each one of the containers 41 includes a rear vertical wall 66 extending vertically downwardly in engagement with the post 43 (FIG. 4) and connected at right angles to a horizontal bottom wall portion 68 which is supported from below by the blocks 56 and 58 and which in turn is integrally connected to a lower vertical front wall portion 71 which extends in a spaced-apart manner relative to the shorter post 54. An intermediate inclined portion 73 is integrally connected at its lower edge to the upper edge of the lower vertical portion 71 and extends upwardly and outwardly where it is connected at its upper edge integrally to a short vertical front wall portion 75 pressed into engagement with the shorter post 54 to wedge the container 41 between the posts 43 and 54. An inwardly bent horizontal portion 77 is connected integrally to the upper edge of the short vertical portion 75 and terminates at its distal end edge portion a short distance from the post 54 to rigidify the container 41.

Thus, the container 41 is a traylike or trough-like opened-top structure, and as shown in FIG. 2 of the drawings, includes a pair of end walls 41A and 41B at opposite ends of the container 41. The return conduits 42 extend through openings in and are sealed to the inner end walls 41B.

Considering now the radially extending conduits 39 in greater detail with particular reference to FIGS. 4 and 5 of the drawings, each one of the radial conduits 39 includes a flexible plastic tube 79 which is perforated at its underside by a series of spaced-apart holes or openings 81 (FIG. 5) to permit the liquid nutrient 26 to fall therefrom under the force of gravity into the open top of the container 41. A rigid strip 83 extends under the plastic tube 79 above the container 41 for supporting the flexible plastic tube 79. A series of spaced-apart holes 85 extending vertically through the rigid strip 83 are aligned with the holes 81 in the tube 79 to enable the liquid nutrient to exit the tube 79 under the force of gravity and fall into the container 41. L-shaped drip sticks 87 are positioned with one of their legs 87A disposed horizontally within the tube 79 and a vertical portion 87B extending axially within the aligned holes 81 and 85.

A series of spaced-apart straps 89 fix the flexible tube 79 to the rigid strip 83. Each one of the straps 89 extends over the tube 79 in and is fixed at its opposite ends to the rigid strip 83 by means of wood screws 90.

As shown in FIG. 4 of the drawings, a support block 92 is fixed to and extends from the longer post 43 above the container 41 to support the feed conduit 39. In this regard, the support block 92 is fastened to the post 43 by means of a pair of wood screws 94. A groove or slot 96 in the upper edge of the support block 92 receives the rigid strip 83 partially therewithin for support purposes. A series of brackets and screws 98 fix the underside of the strip 83 to the support block 92, as best seen in FIG. 4 of the drawings.

Referring now to FIG. 6 of the drawings, there is shown diagrammatically a portion of a hydroponic gardening apparatus 101, which is constructed according to the present invention, and which is similar to the apparatus 10 except that the feed conduits and containers are arranged in rows instead of a radial pattern. The apparatus 101 includes a series of opened-top containers or trays 103 arranged in a side-by-side parallel spaced-apart manner, each one of the containers being elongated rectangularly in shape. The containers 103 are filled with a hydroponic growing media (not shown) and are similar to the containers 41.

A series of parallel spaced-apart perforated feed conduits 105 extend above corresponding ones of the containers 103 to supply liquid nutrient thereto in a similar manner as the feed conduits 39. A feed header 107 is connected in fluid communication with each one of the conduits 105, which are inclined downwardly away from the header 107 and terminate at their outermost closed distal end portions to guide the flow of liquid nutrient under the force of gravity along the conduits 105 over the containers 103 to drip therein in a similar manner as the apparatus 10. A series of return conduits 108 interconnect in fluid communication the ends of the conduits 105 to a return header or drain 109.

A pump and reservoir arrangement (not shown) similar to the pump 28 and upper and lower reservoirs 35 and 24 are used to supply liquid nutrient to the feed header 107 and to receive liquid nutrient back from the return header 109.

The containers 103 and feed conduits 105 are supported by means (not shown) attached to the posts (not shown) of the shelter (not shown) in a similar manner as the apparatus 10 and shelter 12 of FIG. 1.

In both the radial containers 39 of FIG. 1 and the side-by-side containers 103 of FIG. 6, the arrangement enables a compact spacing of the containers for conserving valuable space within the interior of the shelter, and yet there is adequate spacing to permit the gardener to tend to the growing plants.

It will become apparent to those skilled in the art upon a review of the disclosed embodiments of the present invention that conventional growing media and liquid nutrient used for hydroponic gardens may be employed with the apparatus of the present invention. Also, usual hydroponic gardening techniques may be employed, such as recirculating the liquid nutrient at certain predetermined time intervals.

It will also become apparent to those skilled in the art that there are many different modifications that may be made to the disclosed embodiments of the present invention. By way of example and not by way of limitation, different materials may be employed, such materials may include metal and plastic materials. Therefore, the invention is to be limited only by the true spirit and scope of the appended claims.

I claim:

1. In hydroponic gardening apparatus, the combination comprising:

means defining a lower reservoir containing a liquid nutrient;

means defining an upper reservoir;

pumping means for flowing liquid nutrient from said lower reservoir to said upper reservoir;

a plurality of opened top containers having growing media disposed in the interior thereof and being adapted to support and to nourish plants therein;

a plurality of inclined feed conduits connected in fluid communication with the interior of said upper reservoir above said containers for guiding under the force of gravity liquid nutrient from said upper reservoir to said containers;

return conduit means connected in fluid communication with said containers for guiding liquid nutrient therefrom back to said lower container;

a shelter construction having a series of upright posts arranged in concentric circles and directly on the top portions of at least some of said posts supporting a translucent cover, said conduit means and said containers being supported above the ground by said posts, each one of said conduit means and each one of the elongated containers being supported by a plurality of said posts disposed on different ones of said circles; and said plurality of containers being similar to one another and being arranged in a spaced-apart manner, said plurality of similar feed conduits being disposed above individual ones of said containers.

2. In hydroponic gardening apparatus, the combination according to claim 1, wherein said feed conduit includes flexible perforated tubing mounted on top of an elongated rigid strip disposed above said containers, said tubing having a series of spaced-apart openings on its underside.

3. In hydroponic gardening apparatus, the combination according to claim 2, further including a plurality of L-shaped rods extending at least partially within individual ones of said openings for guiding liquid nutrient therefrom.

4. In hydroponic gardening apparatus, the combination according to claim 1, further including a closure removably attached over the mouth of the upper reservoir, wherein said pumping means includes a discharge outlet, a pump conduit connected at one of its ends to said outlet in fluid communication therewith and at its opposite end portion through an opening in the bottom wall of said means defining said upper reservoir to discharge said liquid against the inside of said upper reservoir against the inside surface of said closure.

5. In hydroponic gardening apparatus, the combination according to claim 4, wherein said container slopes toward said lower reservoir.

6. In hydroponic gardening apparatus, the combination according to claim 1, wherein said plurality of containers are arranged in a radially extending manner.

7. In hydroponic gardening apparatus, the combination according to claim 1, wherein said plurality of containers are arranged in a plurality of rows, further including a feed header connected in fluid communication with said feed conduits and a return header connected in fluid communication with said return conduits.

8. In hydroponic gardening apparatus, the combination according to claim 1, wherein said means defining a lower reservoir includes a shallow opened-top container, and an inverted opened-top container resting within the shallow container and extending upwardly therefrom to support said means defining an upper reservoir, said inverted reservoir being similar to said means defining an upper reservoir.

9. In hydroponic gardening apparatus, the combination according to claim 1, wherein at least some of said posts include a rod having a smoothly rounded cover-engaging end portion longitudinally adjustably connected to the upper portion thereof.

10. In hydroponic gardening apparatus, the combination according to claim 9, wherein said posts are arranged in pairs of first and second posts, a plurality of cross means connected across said pairs of posts for supporting individually said containers, each one of said cross means including a pair of elongated blocks extending transversely across their pair of said first and second posts, fastening means for clamping said blocks to their pair of posts, each one of said first post of said pair of posts being a long post extending to said cover, and said second post being a short post terminating at a position spaced from said cover, means for attaching said conduits to the first posts.

* * * * *